(12) United States Patent
Song et al.

(10) Patent No.: US 8,150,592 B2
(45) Date of Patent: Apr. 3, 2012

(54) METHOD FOR PREVENTING DRIVE WHEELS FROM SPINNING

(75) Inventors: Inho Song, Ko-Sang-Si (KR); Christian Rieger, Malsch (DE); Alexander Schweizer, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 827 days.

(21) Appl. No.: 12/283,837

(22) Filed: Sep. 16, 2008
(Under 37 CFR 1.47)

(65) Prior Publication Data

US 2010/0017089 A1    Jan. 21, 2010

(30) Foreign Application Priority Data

Sep. 17, 2007 (DE) .......................... 10 2007 044 332

(51) Int. Cl.
*G06F 19/00* (2006.01)

(52) U.S. Cl. ......................................................... 701/74

(58) Field of Classification Search .................... 701/67, 701/69, 74; 180/197; 73/115.01, 115.04; 192/3.26–3.27, 3.51; 477/34, 39, 70
See application file for complete search history.

(56) References Cited

U.S. PATENT DOCUMENTS

| | | | |
|---|---|---|---|
| 6,015,364 A | 1/2000 | Le Van | |
| 6,266,603 B1 | 7/2001 | Taffin et al. | |

FOREIGN PATENT DOCUMENTS

| | | |
|---|---|---|
| DE | 3711913 | 10/1988 |
| DE | 69604654 | 4/2000 |
| DE | 69808249 | 5/2003 |
| DE | 10247970 | 4/2004 |
| EP | 0180033 | 5/1986 |

*Primary Examiner* — Yonel Beaulieu

(74) *Attorney, Agent, or Firm* — Simpson & Simpson, PLLC

(57) ABSTRACT

A method for preventing spinning of at least one drive wheel in a motor vehicle that has a dual clutch transmission, including the process steps of: a vehicle placed in a first gear unit of the dual clutch transmission; placement of a higher gear for the vehicle in a second gear unit of the dual clutch transmission; detecting whether the at least one drive wheel is spinning; disengaging the clutch that is assigned to the first gear unit, depending on whether spinning was detected; and engaging the clutch that is assigned to the second gear unit, depending on whether spinning was detected.

8 Claims, 3 Drawing Sheets

METHOD FOR PREVENTING DRIVE WHEELS FROM SPINNING

CROSS REFERENCE TO RELATED APPLICATIONS

This patent claims priority of German Patent Application No. 10 2007 044 332.5, filed Sep. 17, 2007, which application is incorporated herein by reference.

FIELD OF THE INVENTION

The present invention relates to a method for preventing a drive wheel of a motor vehicle from spinning.

BACKGROUND OF THE INVENTION

If a vehicle accelerates on a slippery road surface, the force that is supposed to be transmitted to the undersurface by the tires may be greater than the cohesive friction between the tires and the subsurface. This results in the tires spinning, and a lesser friction, sliding friction, develops between the tire and the subsurface. As that occurs, the vehicle may behave in a manner unexpected by the driver; for example, it may not accelerate in the accustomed manner.

This detracts from the driving comfort and safety.

A great number of methods are known in automotive engineering that prevent the drive wheels from spinning in motor vehicles, in particular in automobiles.

To prevent the drive wheels from spinning, the drive wheels may be braked by a conventional traction control, or the driver operates the accelerator pedal less so that less power is transmitted from the drive engine to the drive wheels.

Both methods have the effect that the torque acting on the wheels is reduced, and thus the power that is to be transmitted from the drive wheels to the street is less than the friction between the tires and the street. The result is that cohesive friction again prevails between the wheels and undersurface, and the wheels no longer spin.

DE 696 04 654 T2 shows a control method for automated shift transmissions with a device for avoiding tire slip. It is proposed there that the state of little adhesion of the tires be detected, and that a minimal change of the engine torque conveyed to the wheels be ensured. In so doing the following principles should be parameterized: reducing the engine torque before shifting gears, disengaging the clutch, selecting another gear, engaging the clutch after the gear is selected, restoring the engine torque after shifting gears, and engagement while the vehicle is starting up.

In addition, it is proposed that the shift to second gear be effected automatically while the vehicle is standing still.

DE 698 08 249 reveals the detection of a slippery undersurface, based substantially on analyzing the gradient of a representative parameter for the speed of the driven wheels. This analysis enables automatic activation of a specific mode for controlling the transmission ratios, which is matched to the adhesion of the drive wheels.

In both methods, the driver is confronted with the unexpected behavior of the vehicle right in the exceptional situation in which one or more drive wheels are spinning. Hence the shifting process, in particular the disengagement of the gear shift system, interrupts the transmission of torque to the wheels, and thus an unwanted driving situation is forced on the driver.

BRIEF SUMMARY OF THE INVENTION

One object of the present invention is to provide a method that causes the drive wheels to not spin.

In particular, the problem is solved by a method for preventing at least one drive wheel of a motor vehicle with a dual clutch transmission from spinning, comprising these process steps:

Placing or leaving a vehicle in a first gear unit of the dual clutch transmission;
Placing or leaving a higher gear for the vehicle in a second gear unit of the dual clutch transmission;
Detecting whether at least one drive wheel is spinning;
Disengaging the clutch that is assigned to the first gear unit, depending on whether spinning was detected;
Engaging the clutch that is assigned to the second gear unit, depending on whether spinning was detected.

The higher transmission ratio through which the drive torque of the vehicle engine is transmitted to the drive wheels causes the torque present at the drive wheels to be reduced. This results in the power to be transmitted to the street being less than the sliding friction, so that the tires again return to the state of cohesive friction. The drive wheels are thus prevented from continuing to spin.

However, since the speed of rotation of the drive wheels increases while the speed of the drive engine remains the same, due to the higher transmission ratio, the vehicle loses little or no acceleration. Hence drivability and comfort are scarcely impaired by the procedure for preventing the drive wheels from spinning.

Since this can occur automatically, no intervention by the driver of the vehicle is necessary, so that driving comfort is increased by the automated changing of the transmission ratio.

Through the use of a dual clutch transmission, which can also be a multiple transmission, the changing between gears can be designed to occur without interruption, so that no interruption in the acceleration of the vehicle is perceptible to the driver.

In a preferred embodiment, at least the spinning of one drive wheel is determined by comparing the speed of rotation of the drive wheel to the speed of rotation of a wheel that is not driven directly by the vehicle engine.

Determining the wheel speeds is relatively simple, and is accomplished, for example, by rotation sensors and/or speed sensors situated on the wheels or the corresponding axles. Thus it can be assumed that the drive wheel is spinning if it is moving significantly faster than a wheel that is not driven directly by the vehicle engine.

In one embodiment, the method is preferably employed when starting the vehicle in motion. When starting the vehicle in motion, normally a gear is selected that transmits a high torque to the drive wheels, for example first gear. Because of this high torque and the desire of the driver to accelerate the vehicle, the risk that the drive wheels will spin is great, so that it is particularly expedient to use a method here that prevents the drive wheels from spinning.

The existence of a start-up situation can be detected, for example, by a speed sensor and/or an acceleration sensor, and thus the method for preventing the drive wheels from spinning is actuated by means of an electronic control only if the vehicle was previously standing still.

In another preferred embodiment, in the dual clutch transmission, the drive torque from the drive engine is applied to the at least one drive wheel through the first gear. Meanwhile the second gear is ready in the parallel gear unit of the dual clutch transmission, so that in the event of a drive wheel spinning the shift can be made from the first gear to the second gear.

This prevents the power that is also to act through the drive wheels on the subsurface from exceeding the cohesive friction of the subsurface or of the tires, and thus the tires do not spin.

BRIEF DESCRIPTION OF THE DRAWINGS

The present invention is described in greater detail below through a plurality of drawings, with the drawings in no case representing a limitation of the scope of protection. The drawings show the following.

DETAILED DESCRIPTION OF THE INVENTION

Before the invention is described in detail, it should be pointed out that it is not limited to the particular process steps, since these methods can vary. The concepts here are used merely to describe particular embodiments, and are not used in a restrictive sense. Furthermore, when the singular form or indefinite articles are used in the description or in the claims, this also refers to the plural of these elements, except when the total context makes it clear that something else is intended.

Figure 1:
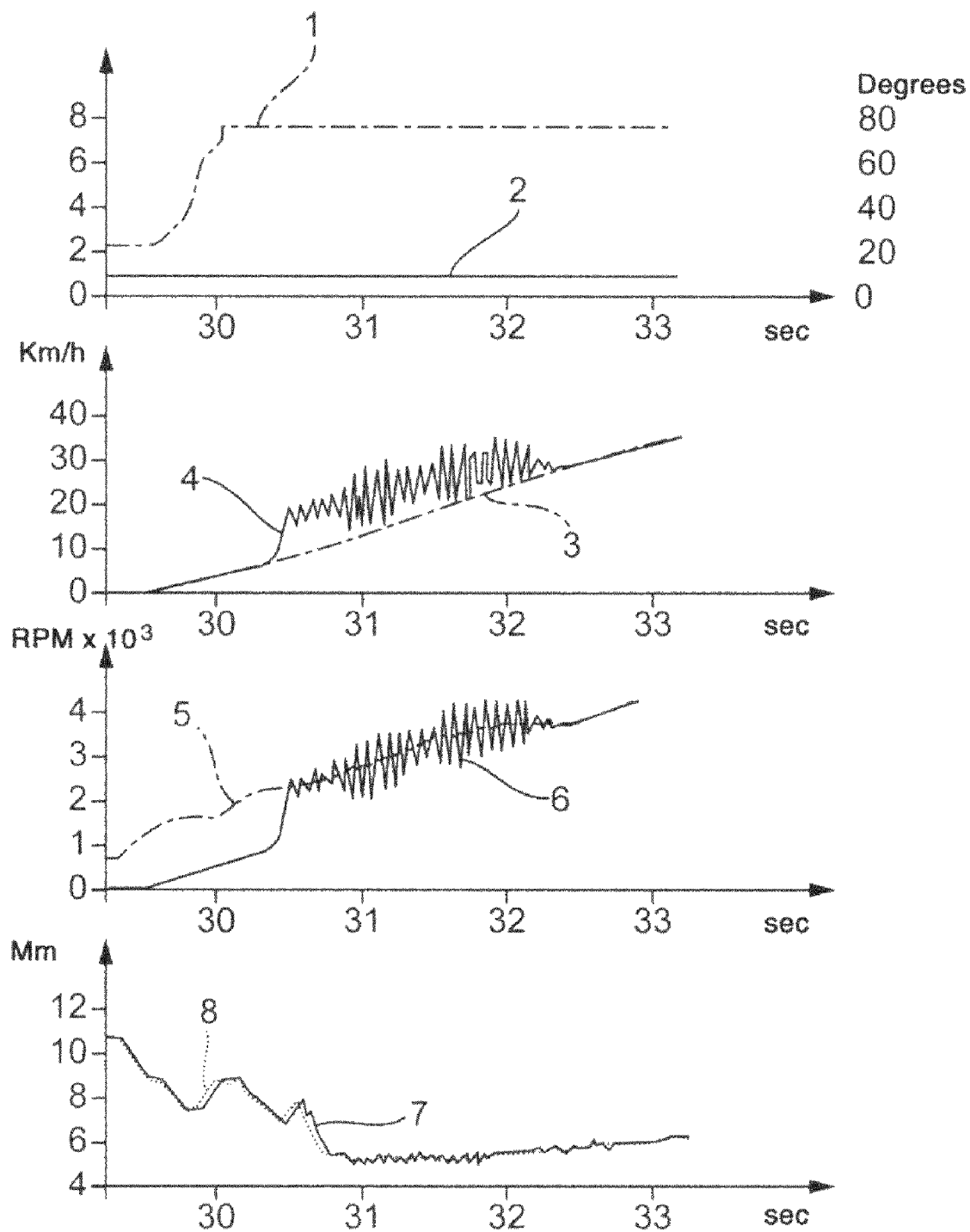
FIG. 1 is a diagram of various typical parameters of a motor vehicle while a drive wheel is spinning.

Line 1 in FIG. 1 shows the position of the accelerator pedal when starting to drive, with the accelerator pedal depressed to its maximum. Line 2 beneath it shows that the first gear remains selected in the transmission during the entire time.

The next diagram down shows by line 3 the speed of the wheels that are not driven directly by the engine, and above that by line 4 the speed of the wheels driven directly by the engine.

Below that, line 5 shows the speed of the engine and line 6 the speed of the drive shaft. Below that, the actual position of clutch 7 and the target position of clutch 8 can be seen.

As shown in FIG. 1, with first gear 2 constantly selected and with the accelerator pedal 1 operated to the maximum, the speed of drive wheels 4 will develop differently from the speed of wheels 3 that are not driven directly by the drive engine. The drive wheels spin. With the drive wheels spinning, the speed of drive wheels 4 becomes significantly higher and speed 4 begins to oscillate severely. The same behavior is then also exhibited by input shaft 6, which acts directly on the drive wheels.

At the same time, the speed of wheels 3 that are not driven directly by the vehicle engine increases constantly. Similar behavior is also exhibited by the rotational speed of engine 5.

The diagram that illustrates clutch position 7 shows that the clutch is engaged during the startup process, and is also engaged for the most part while the wheels are spinning.

Figure 2:
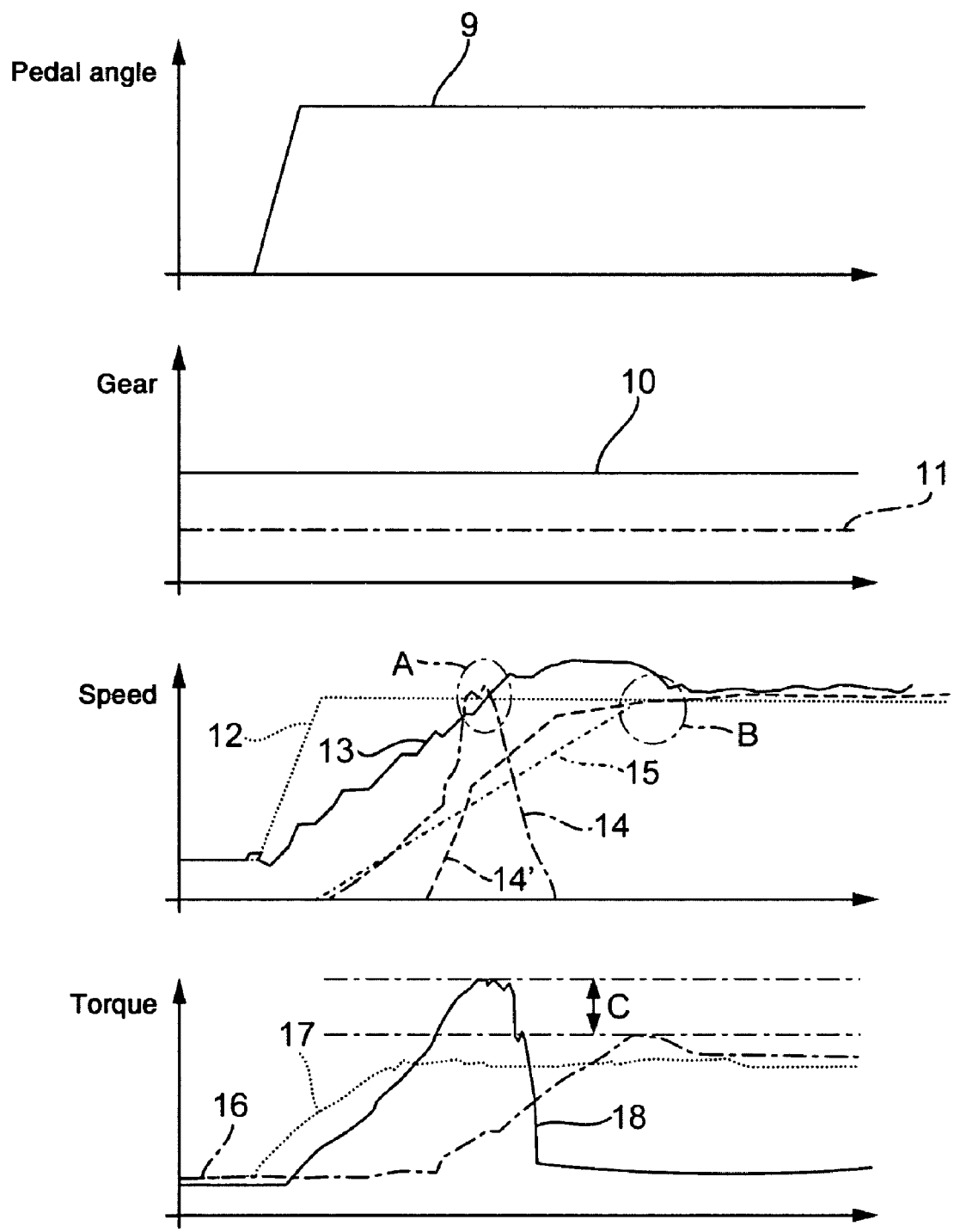
FIG. 2 is a diagram of various typical parameters of a motor vehicle while a method according to the invention is employed; and, FIG. 3 is a flow chart of a method according to the invention.

FIG. 2 likewise shows in the first diagram the position of accelerator pedal 9, in the second diagram first two gears 11, 10 ($1^{st}$ and $2^{nd}$ gears), and in the third diagram the target speed of engine 12, the present speed of engine 13, the drive shaft speed with second gear 14' and the drive shaft speed with first gear 14.

The expected speed of the input shaft without the drive wheel spinning is designated by 15.

A fourth diagram shows the torque of vehicle engine 18, the torque of the output shaft with first gear 17 and the torque of the output shaft with second gear 16.

When starting out, the target speed of engine 12 is set. This occurs, for example, by the driver depressing the accelerator pedal.

The first gear is selected in the dual clutch transmission, and the clutch that is associated with this first gear is engaged. That causes a high torque to be transmitted to the drive shaft, whereupon the drive wheels spin A. The spinning is recognized by the higher speed of the drive wheels compared to the non-driven wheels, and/or by the oscillation of the speed which is characteristic of the spinning. To avoid incorrect assessments, in which spinning of the wheels is assumed although the drive wheels are not spinning, a threshold is introduced that must be exceeded by the difference in speeds of rotation between the drive wheels and the wheels that are not driven directly, in order for spinning to be detected. The clutch which is functionally connected to the second gear is thereupon slowly engaged, while the clutch for the first gear is disengaged. The speed of the engine decreases as a result, and likewise the torque that is transmitted to the wheels. At point B the clutch that is assigned to the second gear is engaged, and the so-called synchronization point is reached.

Figure 3:
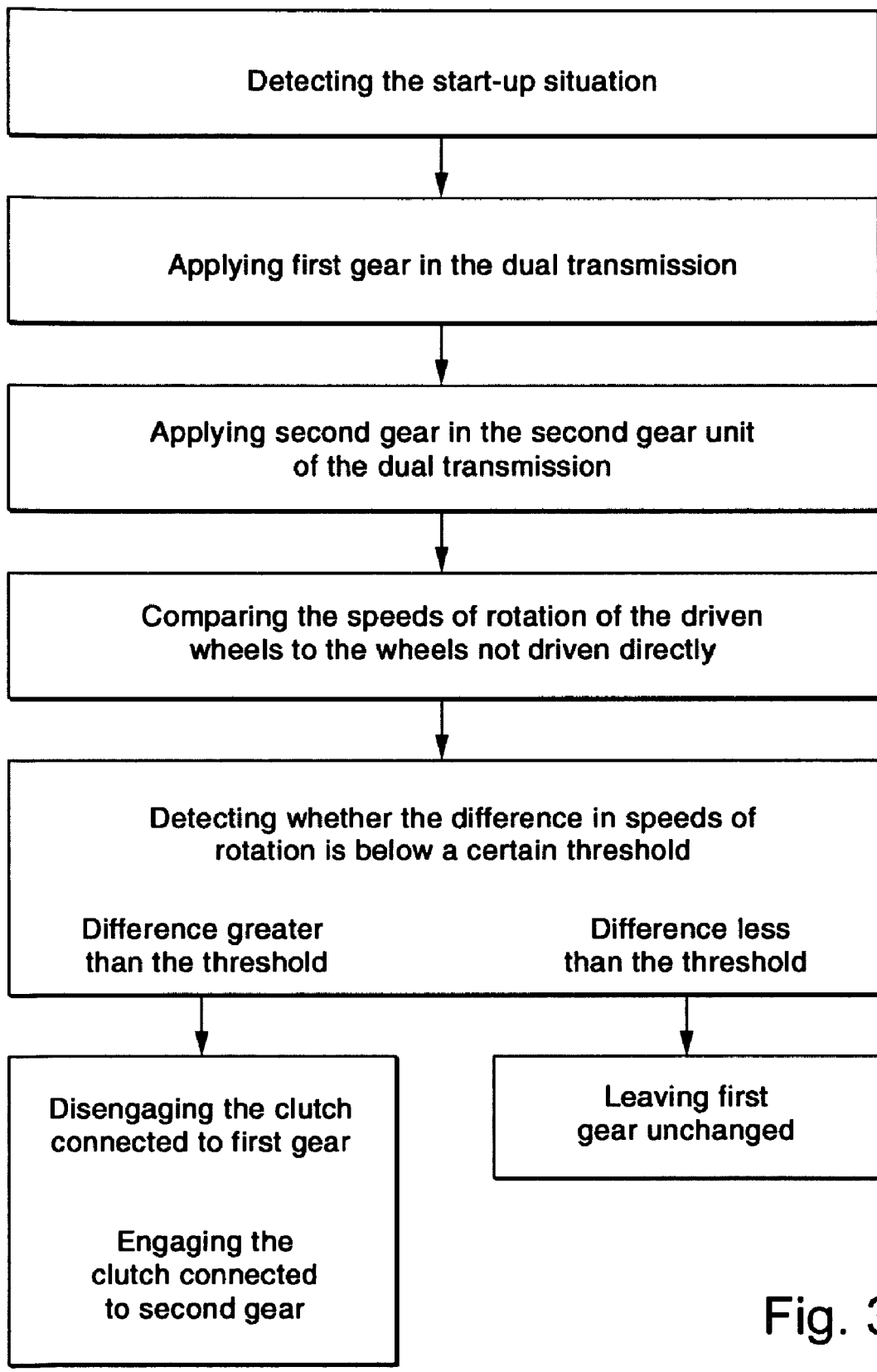

FIG. 3 shows the method in the form of a flow chart. A first step determines whether a startup situation is present. If so, first gear is selected in the first gear unit of the dual clutch transmission, and second gear in the second gear unit. The clutch that connects the drive engine to the first gear is engaged, and thus a torque is transmitted via the first gear to the drive wheels. At the same time the speed of the drive wheels is ascertained, together with the speed of the wheels not driven directly by the vehicle engine or the oscillation of the drive wheels; and if the difference exceeds a certain threshold, the clutch that is assigned to the first gear is disengaged and the clutch that is assigned to the second gear is engaged. This reduces the torque that acts on the wheels, and prevents the wheels from spinning.

REFERENCE LABELS 1 accelerator pedal angle
2 number of the selected gear
3 speed of a wheel that is not directly driven
4 speed of a directly driven wheel
5 speed of the engine
6 speed of the input shaft
7 present clutch position
8 target position of the clutch
9 accelerator pedal angle
10 selected second gear of the dual clutch transmission
11 selected first gear of the dual clutch transmission
12 target speed of the engine
13 speed of the engine
14 input shaft speed with first gear
14' input shaft speed with second gear
15 expected input shaft speed without spinning
16 output shaft torque with second gear
17 output shaft torque with first gear
18 engine torque
A Spinning of the wheels has been detected; the clutch for the first gear is disengaged and the clutch for the second gear is engaged.
B synchronization point
C Because of the difference in transmission ratio between first and second gear, the torque at the output shaft is reduced in second gear.

What we claim is:

1. A method for preventing spinning of at least one drive wheel of a motor vehicle with a dual clutch transmission, comprising the process steps:
   placing or leaving a vehicle in a first gear unit of the dual clutch transmission;
   placing or leaving a higher gear for the vehicle in a second gear unit of the dual clutch transmission;
   detecting whether the at least one drive wheel is spinning;
   disengaging the clutch that is assigned to the first gear unit, depending on whether spinning is detected;
   engaging the clutch that is assigned to the second gear unit, depending on whether spinning is detected.

2. The method according to claim 1, wherein the method is used when starting to drive the vehicle.

3. The method according to claim 1, wherein the first gear unit comprises at least one gear and the method further comprising selecting, in the first gear unit, a gear from the at least one gear that is provided for normal startup.

4. The method according to claim 3, wherein the at least one gear comprises first gear and wherein the gear that is provided for normal startup is the first gear.

5. The method according to claim 1, wherein the first and second gear units comprises at least one first and second gear, respectively, and the method further comprising: in the first gear unit, selecting a gear from the at least one first gear; and, in the second gear unit, selecting a gear from the at least one second gear that is one level higher than the gear selected from the at least one first gear.

6. The method according to claim 1, wherein the vehicle comprises at least one wheel not directly driven and wherein detecting spinning of the at least one drive wheel includes comparing the behavior of the at least one drive wheel to the wheels that are not directly driven.

7. The method according to claim 1, wherein the vehicle comprises at least one wheel not directly driven and wherein detecting spinning of the at least one drive wheel includes comparing the speed of the at least one drive wheel to the at least one wheel that is not directly driven.

8. The method according to claim 7, further comprising: making a determination of whether the speed of rotation of the drive wheel exhibits oscillation; and, using the amplitude or frequency of this oscillation to determine whether the at least one drive wheel is spinning.

* * * * *